(12) United States Patent
Meckenstock et al.

(10) Patent No.: US 10,801,397 B2
(45) Date of Patent: Oct. 13, 2020

(54) CONNECTING ARRANGEMENT FOR TURBOCHARGER ACTUATOR

(71) Applicant: Ford Global Technologies, LLC, Dearborn, MI (US)

(72) Inventors: Daniel Meckenstock, Wuppertal (DE); Michael Spurling, Romford (GB); Marius Sawatzki, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 15/880,291

(22) Filed: Jan. 25, 2018

(65) Prior Publication Data
US 2018/0223726 A1 Aug. 9, 2018

(30) Foreign Application Priority Data
Feb. 8, 2017 (DE) .......................... 10 2017 201 974

(51) Int. Cl.
*F02B 37/18* (2006.01)
*F02B 39/16* (2006.01)

(52) U.S. Cl.
CPC .......... *F02B 37/183* (2013.01); *F02B 37/186* (2013.01); *F02B 39/16* (2013.01); *F02B 2039/166* (2013.01); *F05D 2220/40* (2013.01); *F05D 2240/90* (2013.01); *Y02T 10/144* (2013.01)

(58) Field of Classification Search
CPC ...... F02B 37/183; F02B 37/186; F02B 39/16; F02B 39/00; F02B 2039/166; F05D 2220/40; F05D 2240/90; Y02T 10/144

USPC ....................................................... 60/605.2
See application file for complete search history.

(56) References Cited

U.S. PATENT DOCUMENTS

| 4,927,203 | A | * | 5/1990 | Mayer | E05B 81/25 292/201 |
|---|---|---|---|---|---|
| 5,552,647 | A | * | 9/1996 | Tinkham | H01H 9/16 200/17 R |
| 7,334,799 | B2 | * | 2/2008 | O'Hara | F01D 11/003 277/361 |
| 7,818,964 | B2 | * | 10/2010 | Muramatsu | F01N 1/003 60/324 |
| 9,481,238 | B2 | | 11/2016 | Tiefenbacher et al. | |
| 10,077,710 | B2 | * | 9/2018 | Garcia Alcaraz | F16J 3/043 |
| 2004/0128997 | A1 | * | 7/2004 | Parker | F01D 17/14 60/602 |

(Continued)

FOREIGN PATENT DOCUMENTS

| CN | 103661324 A | 3/2014 |
|---|---|---|
| CN | 203925732 | * 11/2014 |

(Continued)

OTHER PUBLICATIONS

Machine Translation CN 203925732 (Year: 2020).*

*Primary Examiner* — Thai Ba Trieu
*Assistant Examiner* — Dapinder Singh
(74) *Attorney, Agent, or Firm* — Geoffrey Brumbaugh; McCoy Russell LLP (57) ABSTRACT

Methods and systems are provided for an actuator connected to a turbocharger via a connecting arrangement. In one example, a system may include a connection arrangement which yields above a threshold force. The yielding of the connection arrangement may allow the movement of the actuator in a predetermined direction.

20 Claims, 7 Drawing Sheets

(56) References Cited

U.S. PATENT DOCUMENTS

| | | | |
|---|---|---|---|
| 2005/0184480 A1* | 8/2005 | Arlt | B62D 3/12 |
| | | | 280/89.12 |
| 2006/0131116 A1* | 6/2006 | Plantan | B60T 17/083 |
| | | | 188/153 D |
| 2006/0242952 A1* | 11/2006 | Muramatsu | F01N 1/003 |
| | | | 60/299 |
| 2011/0133439 A1 | 6/2011 | Pearce | |
| 2014/0174075 A1 | 6/2014 | Garcia Alcaraz | |
| 2019/0319248 A1* | 10/2019 | Sawatzki | H01R 13/635 |

FOREIGN PATENT DOCUMENTS

| | | |
|---|---|---|
| DE | 102012009940 A1 | 11/2013 |
| DE | 112012000810 T5 | 11/2013 |
| JP | 2015120469 A | 7/2015 |

\* cited by examiner

CONNECTING ARRANGEMENT FOR TURBOCHARGER ACTUATOR

CROSS REFERENCE TO RELATED APPLICATION

This application claims priority to German Patent Application No. 102017201974.3, filed Feb. 8, 2017. The entire contents of the above-referenced application are hereby incorporated by reference in their entirety for all purposes.

FIELD

The present description relates generally turbochargers, actuators, and connecting arrangements between turbochargers and actuators.

BACKGROUND/SUMMARY

Turbocharger are used to increase motor vehicle performance. Turbochargers may include a housing and an actuator. The actuator may influence operating parameters of the turbocharger. The actuator may be attached to the housing by a connecting arrangement.

In modern motor vehicles, turbochargers are used to increase the power of the internal combustion engine. In some embodiments, air at high pressure is supplied to the inlet of the internal combustion engine. The turbocharger comprises a turbine and a compressor which are mechanically coupled together. A turbine wheel may be coupled to a compressor wheel via a common shaft. The turbine wheel is driven by the exhaust gas flow from the internal combustion engine. The compressor wheel is driven via the common shaft which compresses the air supplied to the internal combustion engine. Various configurations are known for both the turbine and the compressor.

The function of the turbocharger or the sequence of the compression process may be manipulated or regulated. Thus for example, the pressure generated in the compressor may be limited by a bypass channel. This bypass channel may be approximately parallel to the turbine and exhaust gases may be conducted past the turbine through the bypass channel. The quantity of exhaust gas flowing through the bypass channel is regulated by a valve which is also known as a "boost control valve" or "wastegate".

A boost control valve or wastegate may in turn be operated via an actuator coupled to the compressor. Such an actuator may be controlled pneumatically via the boost pressure. For example, a spring-loaded piston or a membrane may be arranged inside a cylinder. The piston acts on an actuating rod which in turn operates the valve. The interior of the cylinder is connected to the interior of the compressor via a supply line so that one side of the piston is loaded with the boost pressure. The force of the spring is selected such that when a specific boost pressure is exceeded, the piston with the actuating rod is moved so that the bypass channel is opened by the valve. Such an actuator is also known as a pressure can.

Electronic boost pressure control is also known and uses determinations of the boost pressure and other parameters via sensors. An electrically powered actuator operates the valve via a further actuating rod.

The actuator itself may be connected to a housing of the turbocharger, in particular of the compressor. One possible structural form is a cylinder that lies on a fork-shaped holder, wherein the actuating rod is guided between two arms of the holder. Each arm may have a bore through which a bolt is guided for attachment of the actuator.

The actuator and actuating rod are components that can impact energy adsorption and component intrusion outside the engine compartment during a collision. The actuator and actuating rod may constitute an enlargement of the dimensions of a transversely mounted engine. Often, the components described are arranged in front of the bulkhead which may be close to the passenger space and the dashboard. Because of the mechanical stability, both the actuator and the actuating rod resist compression under low loads.

In the event of a frontal impact, components of the engine may push against and deform the bulkhead. Deformation of the bulkhead can reduce the survival space of the occupants. The potential counterforce provided by the bulkhead in an impact may be lower than necessary to compress the actuator and actuator rod. Therefore, there may be an increase of the incompressible portion of the engine in the direction of the passenger compartment. In some vehicles, the components described may impact in the region of load-bearing structural cross-members and compromise the integrity of the passenger cell.

In one example, the issues described above may be addressed by a turbocharger including a housing and an actuator attached to the housing via a connecting arrangement. The connecting arrangement may be configured to yield when a threshold force between the actuator and the housing is exceeded. The yielding of the connection arrangement may allow a movement of the actuator. In this way, the actuator and actuating rod become movable and do not contribute to the portion of the engine which may interfere with the passenger collision performance.

As one example, the connection arrangement may comprise a bracket which is configured to guide the movement of the actuator. The bracket may include slots for the actuating rod and these slots may guide the movement of the rod in a collision. Furthermore, areas of the bracket may be designed with material thickness such that the areas yield when a threshold force is exceeded. These yielding areas may allow movement of the actuator in a particular direction. Controlling the movement of the actuating rod in a collision allows for the rod to be diverted in a direction away from the passenger compartment in a collision.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-7 are shown approximately to scale, although other relative dimensions may be used, if desired.

DETAILED DESCRIPTION

The following description relates to configurations of turbochargers connected with actuators. Embodiments of these configuration include connection arrangements which yield when a threshold force is exceeded. Further embodiments of these connection arrangements, such as brackets, include features which guide the movement of the actuator when the threshold force is exceeded. Embodiments of the guided movement include elongate openings which provide a low resistance movement path for the actuator and guide plates which restrict the movement of the actuator to certain directions.

One embodiment of the disclosure provides a turbocharger for a motor vehicle. In operating state, the turbocharger may be connected to an internal combustion engine of the motor vehicle or is part of this internal combustion engine. The wheel of a compressor of the turbocharger is coupled via a common shaft to a turbine wheel of a turbine of the turbocharger. The turbine may be driven by the exhaust gas flow of the internal combustion engine. The compressor compresses air supplied to the engine and thus brings this to a boost pressure which lies above atmospheric pressure. Embodiments of the disclosure include many arrangements and geometries of a turbine and compressor.

One embodiment of a turbocharger has a housing and an actuator which may influence operating parameters of the turbocharger. The actuator is attached to the housing by a connecting arrangement. The housing may be composed of an arbitrary number of components and serves for gas-tight accommodation of the turbine wheel and compressor wheel. Furthermore, the turbine wheel and the compressor wheel may be mounted rotatably to the housing. The housing usually consists of metal such as gray cast iron or aluminum. Different metals may also be used for different housing parts. A bypass channel may be formed on or inside the housing, wherein an exhaust gas flow may be guided past the turbine wheel. The bypass channel may include a valve which may control the exhaust gas flow inside the bypass channel.

Embodiments of the actuator may influence operating parameters of the turbocharger including boost pressure. The actuator may act directly or indirectly on a valve which controls the exhaust gas flow inside the bypass channel. The valve may be hydraulically or pneumatically operated. An example, is a pressure can which is describe above. An electrically powered actuator may also be used and may be controlled depending on measurement values from at least one sensor. One such measurement may be a pressure sensor which measures the air pressure inside the compressor. Some embodiments of the actuator are attached to the housing by a connecting arrangement. Parts of the connecting arrangement may be regarded as parts of the actuator, housing, or both. For example, the connecting arrangement is formed at least partially by the housing and the actuator. Embodiments of the actuator may be arranged on an outside of the housing. During normal operation of the motor vehicle, the actuator is rigidly connected to the housing.

Figure 1:
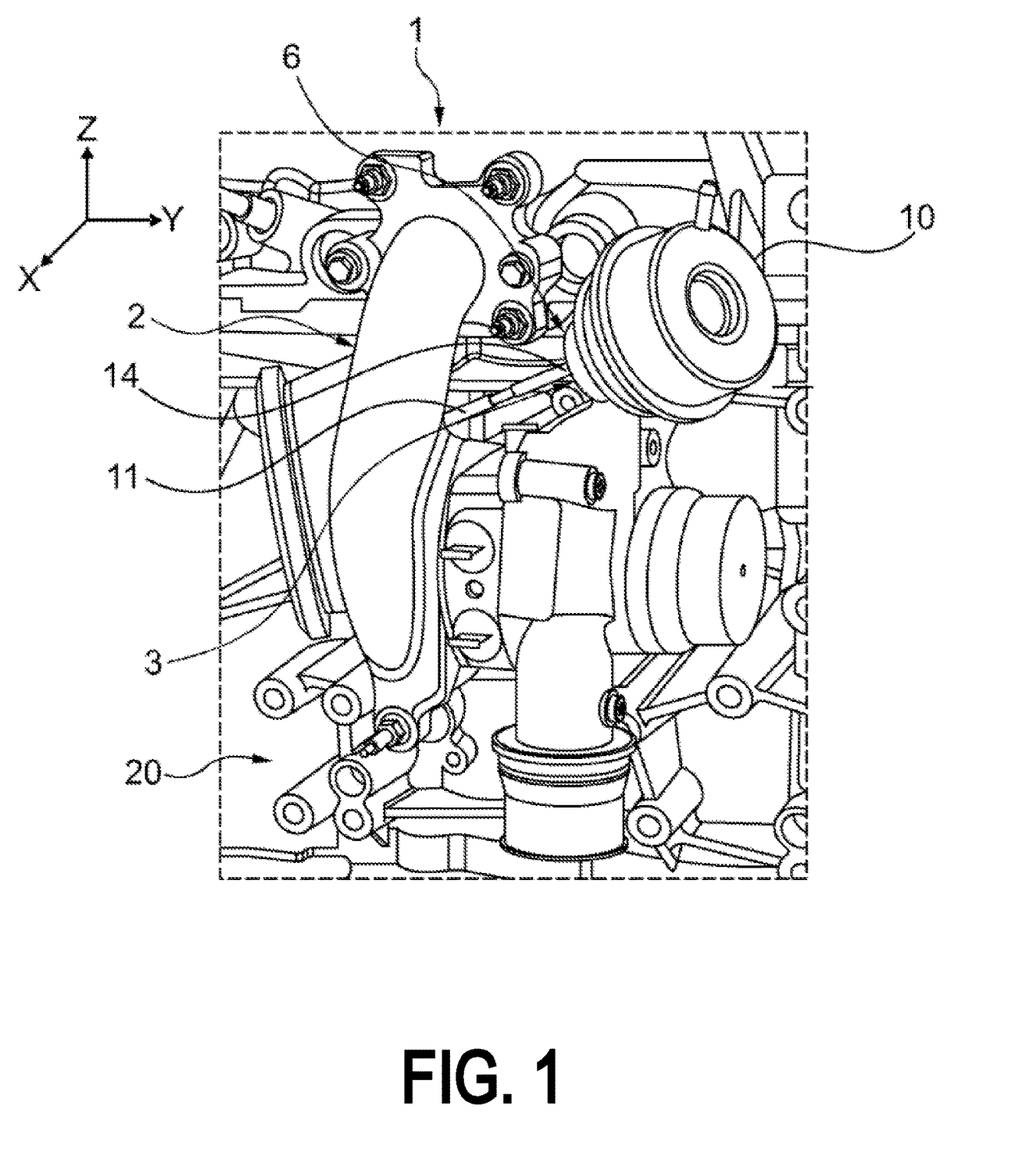
FIG. 1 shows a perspective view of a motor vehicle engine with a turbocharger.

FIG. 1 shows a perspective view of a turbocharger 1 which is connected to an engine 20 of a car. The turbocharger 1 has a multi-piece housing 2, inside which a turbine wheel (not shown) and a compressor wheel (also not shown) are arranged. The two wheels are connected in the known fashion via a common shaft. Furthermore, a valve, not shown, is also arranged in the housing 2 and controls access to a bypass channel, by which some of the engine exhaust gases can be conducted past the turbine. This valve serves to regulate the boost pressure generated by the compressor. Regulation takes place by actuator 10 which acts on a valve lever 12, shown in FIG. 2, via an actuating rod 11. The actuator 10 may be operated pneumatically via the boost pressure. Electronic control for example is also possible, wherein the actuator 10 is controlled based on one or more sensor measurement values.

Figure 2:
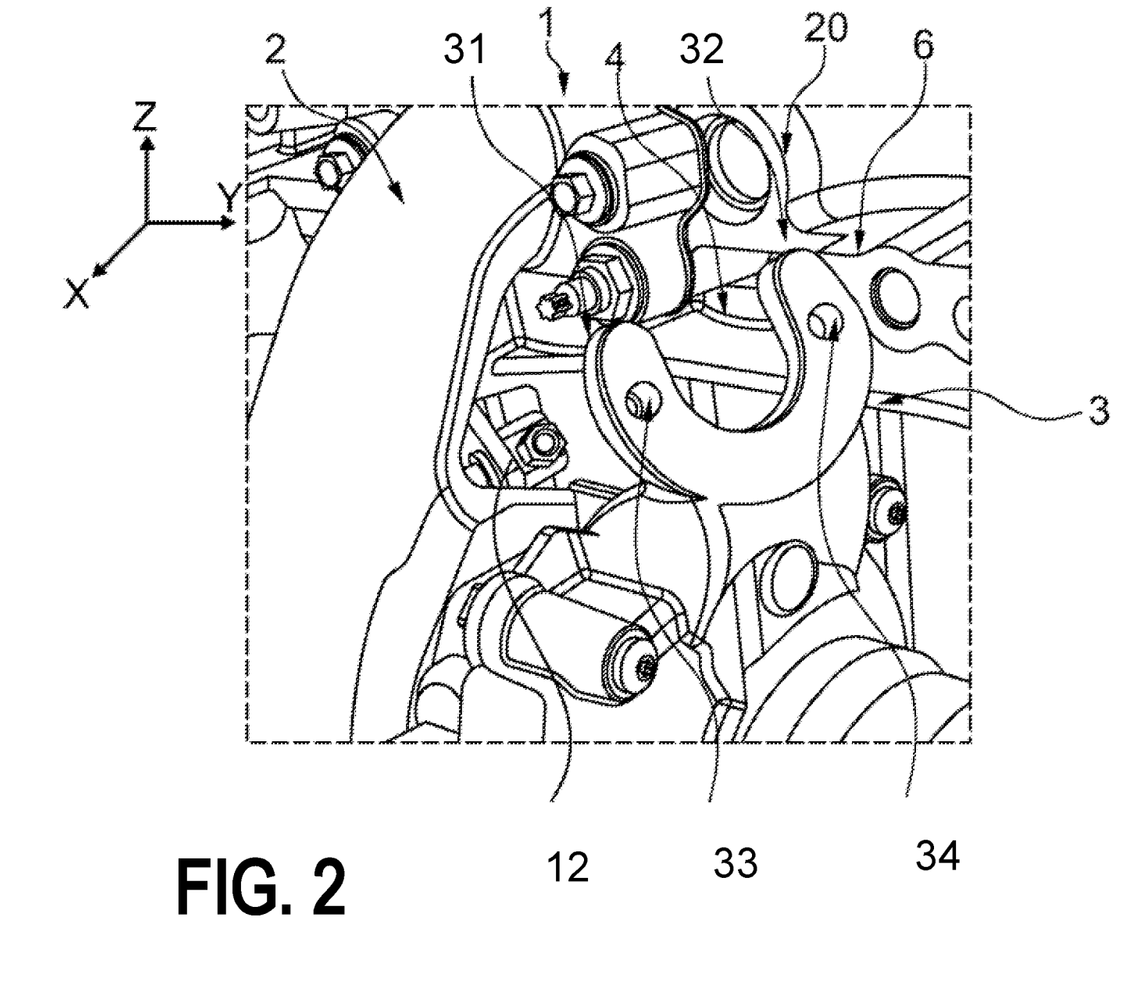
FIG. 2 shows a detailed depiction of parts of the turbocharger from FIG. 1.
Figure 4:
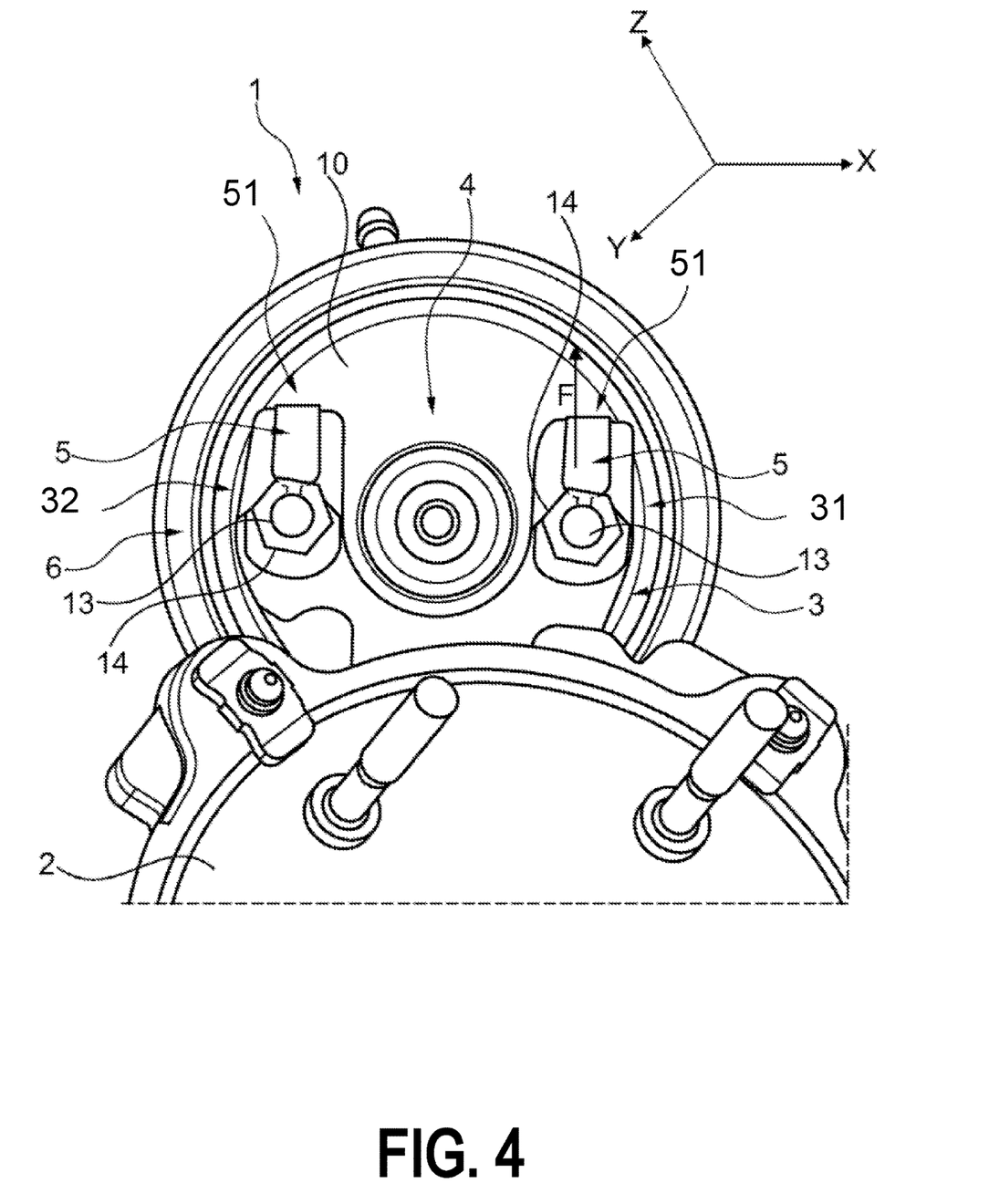
FIG. 4 shows a perspective view of part of the turbocharger of a further embodiment.

In FIG. 2, the housing 2 has a bracket 3 which is formed integrally with a part of the housing 2 to receive the actuator 10. The housing may also be formed separately. The bracket 3 has a first arm portion 31 and a second arm portion 32, between which a recess 4 is formed through which the actuating rod 11 is guided in assembled state, as shown in FIG. 1. Two bores 33 and 34 are provided, through which threaded rods 13, examples of which are shown in FIG. 4, may be guided and secured with nuts 14 in order to attach the actuator 10 to the bracket 3. The bracket 3 and the bolts 13 here form part of a connecting arrangement 6, by which the actuator 10 is attached to the housing 2. In a frontal impact, the actuator 10 connected to the bracket 3 may be pressed together with parts of the housing 2 and pushed against a bulkhead, which could reduce the available energy adsorption and increase intrusion into the passenger compartment of the vehicle. Furthermore, the actuator may not yield under the force between the bulkhead and actuator further.

This risk may be mitigated by using a connection arrangement which yields under a force created by the collision. Embodiments of the connecting arrangement may be configured such that it yields on exceeding of a threshold force between the actuator and the housing. This yielding allows a movement of the actuator. The threshold force corresponds to a predefined threshold level of a force acting between the actuator and the housing. The threshold force is generally not exceeded in normal operation of the motor vehicle, but may be in the case of a frontal impact such as a collision of the motor vehicle with another vehicle or obstacle. Embodiments of the threshold force may not be defined precisely. Depending on requirements, a degree of inaccuracy may persist with regard to the threshold, but a permitted lower limit value may be defined.

If the threshold force is exceeded, embodiments include the connecting arrangement yielding in a planned fashion and allowing the movement of the actuator. In other words, a movement of the actuator relative to the housing becomes possible. In particular, the actuator may become at least partially detached from the housing by the planned yielding. The yielding of the connecting arrangement may include a deformation, separation, or both. In normal operation of the vehicle with forces below the threshold level acting between the actuator and the housing, the actuator is in fixedly attached to the housing. A threshold force that is too low will allow yielding during normal operation which could cause failure of the actuator.

An actuator may move relative to the housing when the threshold force is exceeded therefore, there is a slight risk that the actuator will be pushed in the direction of the vehicle interior during an impact. In one embodiment the actuator first detaches in a proposed direction such as the load direction, and thereafter deflects in another direction. This embodiment allows the actuator to avoid pressure from the housing or other engine parts and also from the bulkhead. Avoiding these pressures may reduce the non-deformable dimension of the engine.

Embodiments of the connecting arrangement have a bracket and at least one connecting element for connecting the bracket to the actuator. The element is guided through a passage opening of the bracket. The bracket here may be configured integrally with the housing or part of the housing. For example, the bracket may be the same component may form the bracket and serve to surround parts of the compressor or turbine. At least one connecting element is provided to connect the bracket to the actuator the connecting element is guided through a passage opening of the bracket. The connecting element may include a shaft or pin. In particular, the connecting element may be a threaded pin or a bolt. The bolt may be screwed directly to the actuator or it may extend through a further passage opening of the actuator. The bolt may cooperate with a nut such that the actuator is clamped against the bracket. It is also possible that a threaded pin is connected with the actuator and is guided through the passage opening, wherein a nut is screwed onto the opposite end of the threaded pin. The passage opening may be configured as a through bore or similar. It may in some cases be threaded, at least in portions.

According to an embodiment, the bracket has two arm portions each with a passage opening for a connecting element. The actuating rod is guided between the arm portions. The bracket may be configured fork-shaped, U-shaped or Y-shaped. The arm portions may be joined together by a base portion which is also part of the bracket. The arm portions may be formed symmetrically or asymmetrically. The arm portions may include one or more passage openings for a connecting element. For example, an actuator connected to each of the arm portions via the connecting elements.

The actuating rod may be regarded as part of the actuator or as a part on which the actuator acts. Usually, a rod made of metal serves to transmit traction and compression forces. The rod may act on a lever which determines the opening degree of the valve. For example this may correspond to a structure in which the valve is arranged on the bypass channel near the turbine while the actuator is arranged at a distance therefrom near the compressor. Embodiments of the actuator are attached approximately symmetrically to properly transmit forces. This transmittal may occur properly if the connecting rod is guided between the arm portions.

In some embodiments, at least one passage opening is formed so as to be elongate. The elongate passage may be oriented transversely to its passage direction. For example, it may be oriented along the running direction of the connecting element guided through it. The passage opening may be configured as a slot and may be straight, curved or angled. The shape of the passage opening may allow a movement of the connecting element transversely to its running direction.

In normal operating state, transverse movement is undesirable. Therefore, some embodiments of the connecting element are secured in its position under forces at or below the threshold level. This can be achieved by a force-fit connection such as those using friction forces. A form-fit connection is also possible. When the threshold force is exceeded, the connecting element may then move along the passage opening. The passage opening may therefore form a guide element for the connecting element and also for the actuator.

In embodiments of an elongate passage opening with a force-fit connection of the bracket to the actuator, the connecting element is arranged at a first end of the passage opening and a material thickness of the bracket reduces from the first end to a second end. In other words, in this case a force-fit connection may be created between the bracket and the actuator by the connecting element. The connecting element may be arranged at a first end of the passage opening. In the region of the first end, the material thickness of the bracket is greater than at a second end. This leads to elimination of the force-fit connection when the connecting element is moved from the first end towards the second end on exceeding of the threshold force. The elimination of the force fit connection furthers the possibility of movement.

According to a further embodiment, at least one passage opening is open at the edge. In this way, it may be possible that the connecting element is withdrawn from the passage opening at the edge side, which leads to a complete detachment of the actuator from the bracket.

Other embodiments include the bracket having at least one securing element for securing the position of the connecting element, wherein the at least one securing element is configured to yield in a planned fashion when the threshold force is exceeded. The securing element may create a form-fit connection to the connecting element which is overcome when the threshold force is exceeded. As long as the relative force between the actuator and the housing, or between the actuator and the bracket, lies below the threshold force, the securing element prevents movement of the connecting element and actuator. If the threshold force is exceeded, the securing element yields in planned fashion, whereby movement of the connecting element and actuator becomes possible. There may be a plurality of cooperating securing elements. If several passage openings are provided, at least one securing element may be arranged at each of the passage openings. The respective securing element may be formed integrally with the bracket.

Embodiments of the securing element may deform in order to allow the movement of the connecting element when the threshold force is exceeded. According to another embodiment, at least one securing element is configured to break away from the bracket when the threshold force is exceeded. In contrast to deformation, it may be more likely that the actuator movement is triggered when a threshold force is reached. The securing element may have a nominal break point or as a whole be formed weaker than adjacent parts of the bracket to initiate the breakaway. An embodiment includes securing elements with lower material thickness.

An embodiment of the securing element may be formed as an inwardly directed protrusion. The term "inwardly directed" refers to the respective passage opening. For example, the protrusion points towards the inside of the passage opening. Thus the protrusion, or lug, creates a local reduction in the inner dimension of the passage opening or locally constricted region. This region constitutes an obstacle for a movement of the connecting element. In particular, two mutually opposed protrusions may be provided on a passage opening, and thus constrict the passage opening on both sides. When the threshold force is exceeded, the protrusions may deform or break away, whereby the movement restriction is eliminated. Such protrusions may in particular be combined with an embodiment in which the passage opening is formed elongate, open at the edge, or both. In order to ensure that the corresponding protrusion yields or breaks away in planned fashion, the protrusion may have a lower material thickness than an adjacent region of the bracket. This lower material thickness may also exist in regions so that the protrusion has a nominal break point. The protrusions or lugs also establish a predefined mounting position which allows easy installation.

Embodiments include the actuator detaching from the bracket when the threshold force is exceeded, whereafter its movement is somewhat random. Other embodiments include a guide face formed on the bracket for guiding the movement of the actuator when the threshold force is exceeded providing greater control over the movement of the actuator. This may be combined with the above-mentioned embodiment in which at least one passage opening is formed elongate. In such a combination, the actuator is guided in its movement firstly by the course of the at least one passage opening and secondly by the guide face. Thus, the actuator may deflect in a desired fashion in the direction towards a predefined position in which it has the smallest possible influence on the deformation of the passenger cell and hence the risk of injury for vehicle occupants is minimized.

In particular, the guide face may run obliquely to the longitudinal axis of the motor vehicle. In other words, the guide face runs neither parallel to the longitudinal axis nor perpendicular thereto. In this way, forces acting in the longitudinal direction may be deflected partially and lead to a shift of the actuator in a direction which runs partially transversely to the longitudinal axis. The course of elongate passage openings may be used to control the force deflection and movement of the actuator more precisely.

With regard to frontal impacts with an obstacle offset to the center axis of the vehicle, for example a barrier overlapping to 40%, the engine may perform a rotation about a vertical axis inside the engine compartment. This rotation may also affects the alignment of the guide face relative to the bulkhead. This could lead to a guide face, which initially ran parallel to the longitudinal axis, standing obliquely to the longitudinal axis after said rotation. For such a case, it may be advantageous if the guide face runs parallel to the longitudinal axis.

Figure 3:
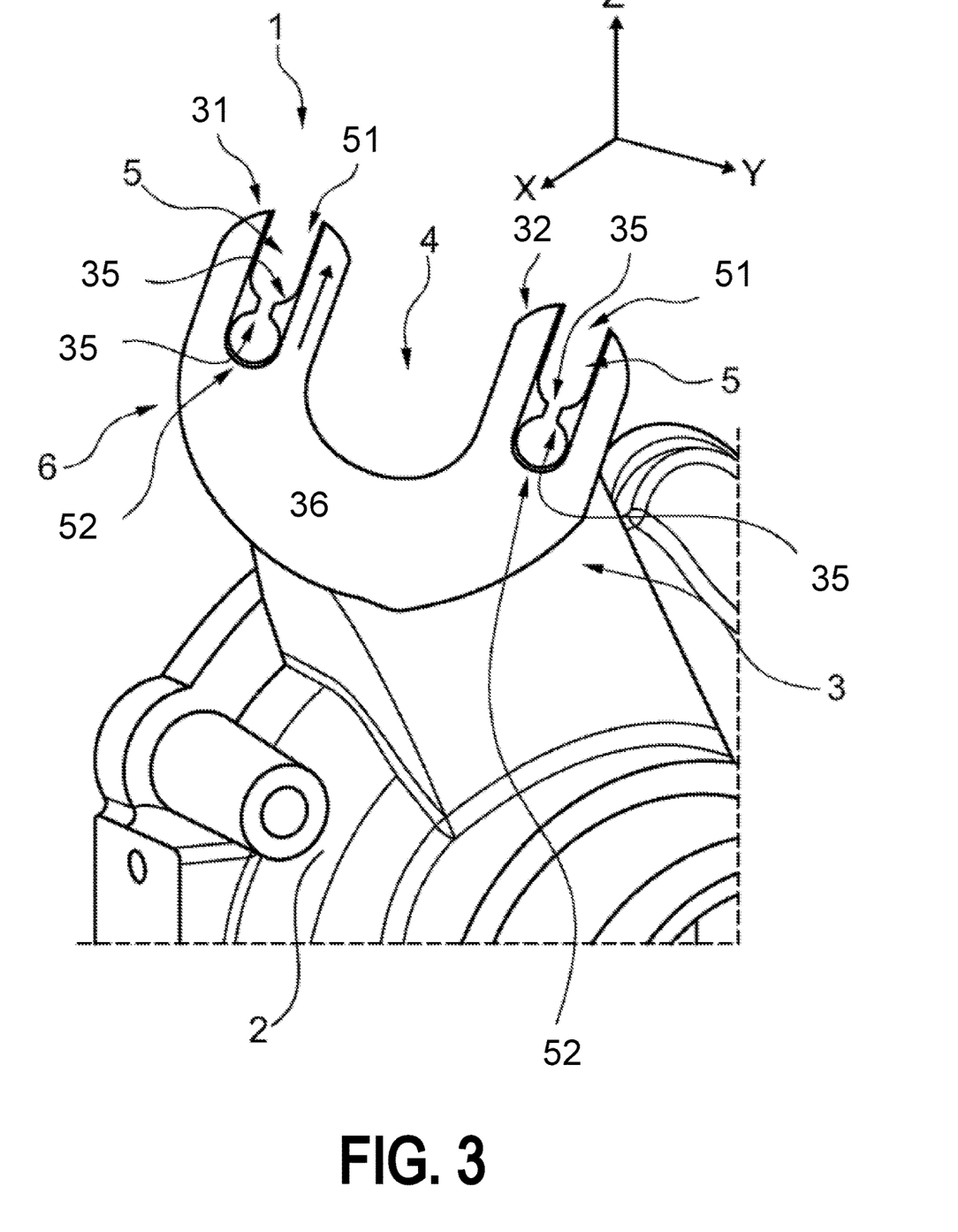
FIG. 3 shows a perspective view of a part of a turbocharger of an embodiment.

Embodiments shown in FIGS. 3 and 4 reduce this risk by use of a bracket 3 with the turbocharger 1. FIG. 3 also shows part of the housing 2 with the bracket 3. FIG. 4 shows a view from a direction which is approximately opposite to that of FIG. 3, wherein the actuator 10 is shown in addition to the housing 2 and the bracket 3. In the turbocharger 1, the bracket 3 again has two arm portions 31, 32 between which a recess 4 is formed through which the actuating rod 11 may be guided. However, elongate passage openings 5 are formed in each of the arm portions 31 and 32, and extend substantially parallel to the course of the respective arm portion 31 and 32. Embodiments of the passage opening 5 are formed open at the edge at an outer end 51. An opposite inner end 52 is provided to receive a threaded rod 13. The respective threaded rod 13 serves to attach the actuator 10 to the bracket 3 and the housing 2. It is connected to the actuator 10 and secured on an opposite side of the bracket 3 by a nut 14, whereby a force-fit connection is created. An alternative to fixing with a threaded rod 13 could be used such as a bolt and nut.

Embodiments shown in FIGS. 3 and 4 include inwardly directed locking lugs 35 lying opposite each other are formed on the bracket 3 and adjacent to the inner end, serve to secure the respective threaded rod 13 against displacement inside the recess 5. The material thickness of the locking lugs 35 may be lower than that of the adjacent parts of the bracket 3. A lower thickness of lugs 35 may induce breaking away if a threshold force F, acting between the actuator 10 and the housing 2, is exceeded. An example of a threshold force F is a component of a force which occurs in a frontal impact, between the turbocharger 1 and the bulkhead. Designing the locking lugs 35 such that they break away may induce a planned movement of the actuator 10. Further embodiments include material thickness of the respective arm portions 31 and 32 being greater in the region of the inner end 52 than in the region of the outer end 51. This material thickness may further induce the planned movement because the force-fit connection of the nuts 14 is eliminated when the respective threaded rod 13 moves away from the inner end 52.

Embodiments shown in FIGS. 3 and 4 further include the movement of the actuator 10 being guided by the bracket 3. The bracket 3 may form a guide face 36 for the actuator 10 which runs in a direction which guides the actuator away from the direction of the passenger compartment. Using the depicted axes, if a force acts on the actuator 10 in the X direction, the course of the guide face 36 leads to the force being deflected in the Y direction and in the Z direction. In some embodiments, the X direction is along the longitudinal axis of the vehicle. The course of the passage openings 5, which form guide elements for the bolts and actuator 10, further deflect the actuator 10 in a direction away from the passenger compartment. Therefore, the guide face 36 and the passage openings 5 may be designed such that the actuator 10 is unlikely to be pushed into the vehicle interior or push other vehicle parts into the vehicle interior.

Figure 5:
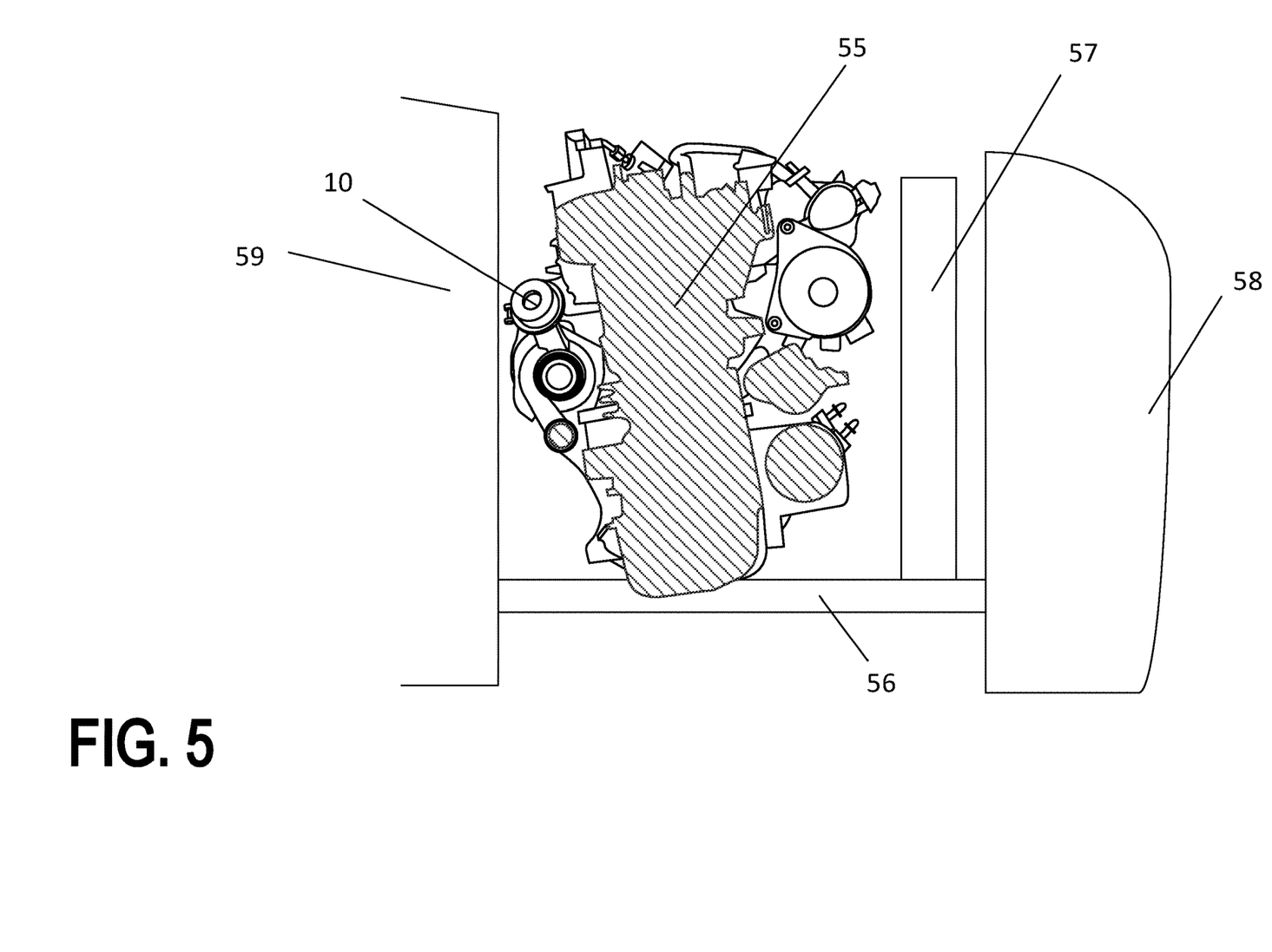
FIG. 5 shows a motor and actuator in relation to a passenger compartment and front of the vehicle.

FIG. 5 shows a general orientation of components of one possible embodiment of a vehicle. FIG. 5 shows how an impact in the front of the vehicle can push components such as the actuator back into the passenger compartment. FIG. 5 depicts a motor 55, including actuator 10, on a frame 56. The motor sits behind a radiator 57 and the front of the vehicle 58. The motor 55 sits in front of passenger compartment 59. In a collision, the front of the vehicle 58 may be pushed back into radiator 57. The radiator may be pushed back into the motor 55. The motor 55 or components of the motor may then be pushed back into the passenger compartment 59. Compression of the passenger compartment leads to a lower amount of survival space for occupants. The actuator 10 can be seen between the motor 55 and passenger compartment 59. Therefore, in collision the actuator 10 can add to the incompressible components being pushed back into the passenger compartment 59. The actuator rod may have increase the deformation of the passenger compartment 59. Therefore, embodiments include a connecting arrangement which allows movement of actuator 10 when a threshold force is exceeded. The actuator 10 may then move in a direction that reduces the risk of the actuator 10 contributing to the deformation of passenger compartment 59.

Figure 6:
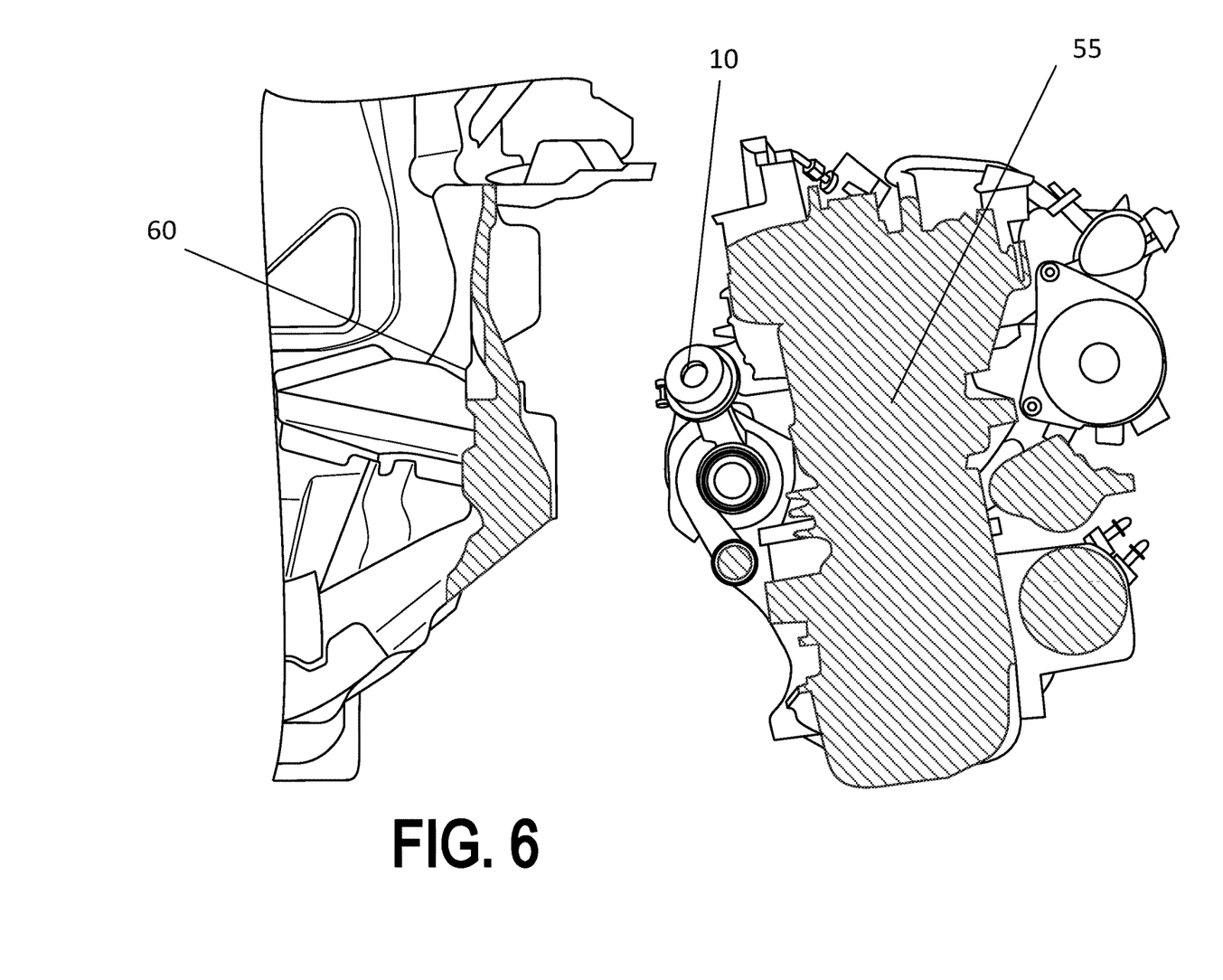
FIG. 6 shows a side view motor and actuator in relation to a bulkhead.

FIG. 6 shows a side view of a motor 55, including an actuator 10, with a bulkhead 60. FIG. 6 shows a side view of a similar arrangement to that of FIG. 5. In FIG. 6, a front end collision may push the motor 55 and actuator 10 into the bulkhead 60. Deformation of bulkhead 60 may lead to reduction of the survival space of the passengers. Alternatively, a front end collision may push components of motor 55 and actuator 10 into bulkhead 60.

Figure 7:
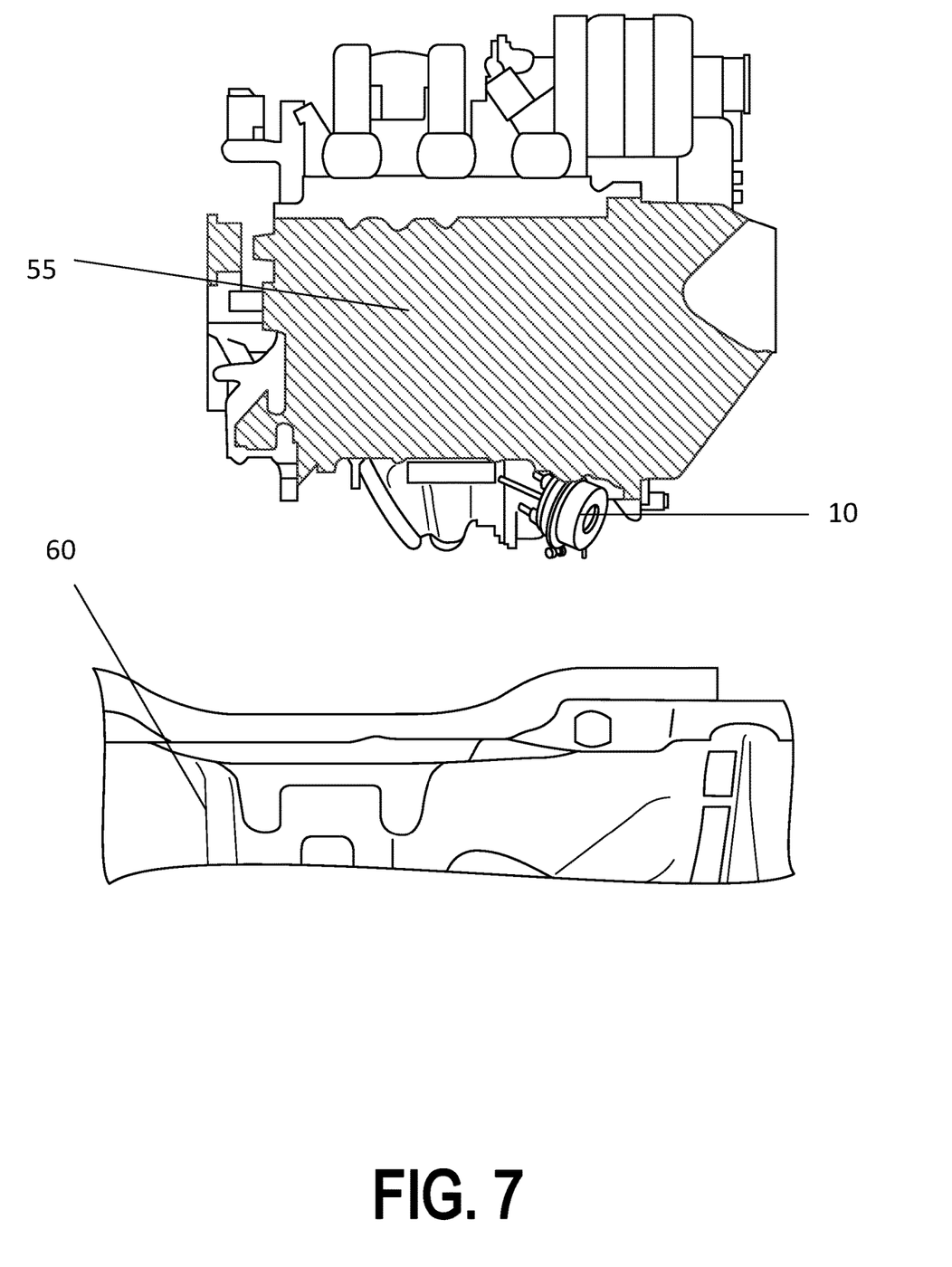
FIG. 7 shows a top view motor and actuator in relation to a bulkhead.

FIG. 7 shows a top view of the embodiment shown in FIG. 6. FIG. 7 demonstrates the position of the actuator 10 and that the position creates the possibility of the actuator 10 being pushed into bulkhead 60.

In this way, movement of the actuator prevents the actuator from adding to the components which may deform the bulkhead. Deformation of the bulkhead may lower the passenger compart volume in a collision. Therefore, intrusion of components outside the engine compartment and energy adsorption can be improved by a connection arrangement for a turbocharger actuator yielding at a predetermined threshold.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A motor vehicle, comprising:
a turbocharger and a turbocharger housing; and
an actuator attached to the turbocharger housing via a bracket, wherein the bracket or a fastener is configured to yield when a threshold force between the actuator and the turbocharger housing is exceeded and the yielding allowing movement of the actuator;
the fastener arranged at a first end of a passage opening of the bracket and a material thickness of the bracket reduces from the first end to a second end.

2. The motor vehicle of claim 1, wherein the fastener connects the bracket to the actuator, and the fastener extends through the passage opening of the bracket.

3. The motor vehicle as claimed in claim 2, wherein the bracket has two arm portions each with a passage opening for the fastener, wherein an actuating rod is guided between the arm portions.

4. The motor vehicle of claim 3, wherein at least one of the passage openings has an elongate shape.

5. The motor vehicle of claim 4, wherein at least one of the passage openings is open at an edge.

6. The motor vehicle of claim 5, wherein the at least of the passage openings is shaped such that the fastener is held in a position and a portion of the at least one of the passage openings is configured to yield when the threshold force is exceeded to release the actuator.

7. The motor vehicle of claim 6, wherein the portion of the at least one of the passage openings configured to yield comprises an inwardly directed protrusion.

8. The motor vehicle of claim 1, wherein the fastener holds the actuator in a position, and yielding of the fastener releases the actuator from the position.

9. The motor vehicle of claim 1, wherein a protrusion of the bracket holds the fastener in a position and the actuator in a position, and yielding of the protrusion releases the actuator from the position.

10. A motor vehicle, comprising:
a turbocharger and a turbocharger housing;
an actuator attached to the turbocharger housing via a bracket;
a fastener extending through a passage opening in the bracket;
the bracket or the fastener configured to yield when a threshold force between the actuator and the turbocharger housing is exceeded; and
the yielding of the bracket or fastener releases the actuator to move along a path defined by the passage opening.

11. The motor vehicle of claim 10, wherein the passage opening is positioned in an arm of the bracket and the passage opening has an elongated shape and is open at a terminal end.

12. The motor vehicle of claim 11, wherein a protrusion is positioned between the fastener and the terminal end.

13. The motor vehicle of claim 12, wherein a material thickness of the protrusion is less than that of the arm of the bracket.

14. The motor vehicle of claim 10, wherein a protrusion of the bracket holds the fastener in a position and the actuator in a position, and yielding of the protrusion releases the actuator from the position.

15. The motor vehicle of claim 14, wherein the protrusion is located on an arm of the bracket, and
the protrusion has a lower material thickness than the arm of the bracket.

16. A vehicle, comprising:
a turbocharger and a turbocharger housing;
an actuator attached to the turbocharger housing via a bracket; and
a guide face of the bracket positioned between a motor and a passenger compartment, and the guide face configured to guide an actuator in a direction oblique to a longitudinal axis of the vehicle upon detachment of the actuator due to detachment or deformation of the bracket or a fastener when a threshold force is exceeded.

17. The vehicle of claim 16, wherein the bracket detaches or deforms when the threshold force is exceeded to release the actuator.

18. The vehicle of claim 17, wherein the guide face extends obliquely to the longitudinal axis and the guide face guides the detached actuator in the direction that the guide face extends.

19. The vehicle of claim 16, wherein an arm extends from the guide face and the fastener is inserted through the arm, and the fastener detaches or deforms when the threshold force is exceeded to release the actuator.

20. The vehicle of claim 16, wherein a shape of a passage through the bracket holds the fastener in a position, and the shape of the passage detaches or deforms when the threshold force is exceeded to release the actuator.

\* \* \* \* \*